United States Patent
Hill

(10) Patent No.: US 7,031,790 B2
(45) Date of Patent: Apr. 18, 2006

(54) OPERATOR FOR SCULPTING SOLIDS WITH SHEET BODIES

(75) Inventor: Kenneth J. Hill, South Lyon, MI (US)

(73) Assignee: Autodesk, Inc., San Rafael, CA (US)

( * ) Notice: Subject to any disclaimer, the term of this patent is extended or adjusted under 35 U.S.C. 154(b) by 184 days.

(21) Appl. No.: 10/663,391

(22) Filed: Sep. 16, 2003

(65) Prior Publication Data

US 2004/0059450 A1 Mar. 25, 2004

Related U.S. Application Data

(60) Provisional application No. 60/412,935, filed on Sep. 23, 2002.

(51) Int. Cl.
*G06F 19/00* (2006.01)

(52) U.S. Cl. ............... 700/118; 700/182

(58) Field of Classification Search ........ 700/117–120, 700/159–163, 180–189
See application file for complete search history.

(56) References Cited

U.S. PATENT DOCUMENTS

| | | | | |
|---|---|---|---|---|
| 4,618,924 A * | 10/1986 | Hinds | .......................... | 700/86 |
| 4,858,149 A * | 8/1989 | Quarendon | .................. | 345/419 |
| 5,179,644 A * | 1/1993 | Chiyokura et al. | ......... | 345/441 |
| 5,295,075 A * | 3/1994 | Korner et al. | ............... | 700/186 |
| 5,351,196 A | 9/1994 | Sowar et al. | ................ | 700/182 |
| 5,497,453 A * | 3/1996 | Megahed et al. | ........... | 345/422 |
| 5,506,785 A * | 4/1996 | Blank et al. | ................... | 700/98 |
| 5,561,601 A * | 10/1996 | Inoue et al. | ................. | 700/182 |
| 5,649,084 A * | 7/1997 | Ernst | .......................... | 345/630 |
| 6,078,330 A * | 6/2000 | Masuda et al. | ............. | 345/420 |
| 6,120,171 A * | 9/2000 | Shaikh | ........................ | 700/98 |
| 6,307,555 B1 * | 10/2001 | Lee | .............................. | 345/423 |
| 6,525,745 B1 * | 2/2003 | Phelan et al. | ................ | 345/676 |
| 6,862,023 B1 * | 3/2005 | Shaikh | ........................ | 345/420 |

OTHER PUBLICATIONS

Ji, Qiang et al., "Machine Interpretation of CAD Data for Manufacturing Applications," ACM Computing Surveys, vol. 24, No. 3, pp. 263-311, Sep. 1997.

* cited by examiner

*Primary Examiner*—Maria N. Von Buhr
(74) *Attorney, Agent, or Firm*—Gates & Cooper LLP

(57) ABSTRACT

A computer-implemented solid modeling system provides a graph-based method that sculpts solids with sheet bodies by performing a selective Boolean operation on a part body and one or more sheet bodies, wherein faces of the sheet bodies separate the part body into regions of space such that the regions are separated from each other by the faces of the sheet bodies. Cells thus formed are selected for inclusion or exclusion in the resulting solid as is specified by an option ("join" or "cut").

42 Claims, 10 Drawing Sheets

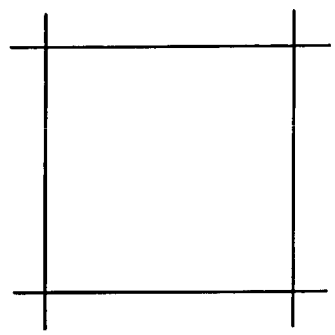
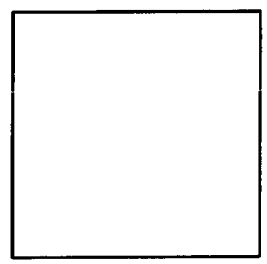
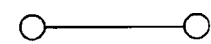
FIG. 18　　　FIG. 19　　　FIG. 20
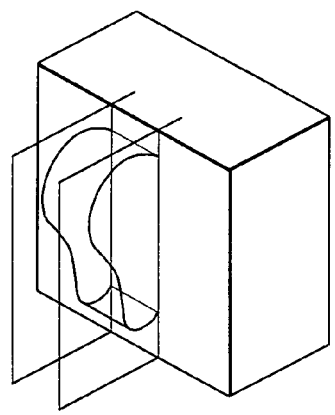
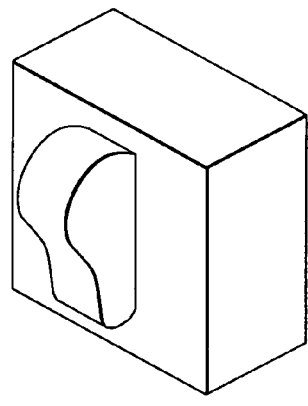
FIG. 21　　　　　　　FIG. 22
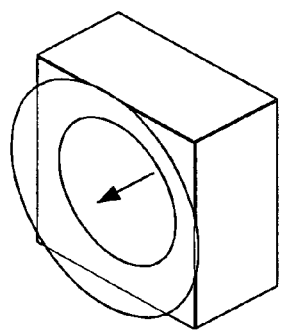
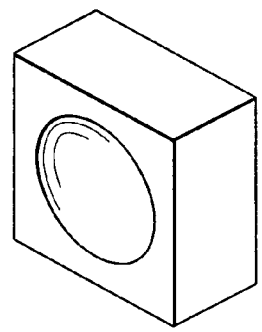
FIG. 23　　　　　　　FIG. 24

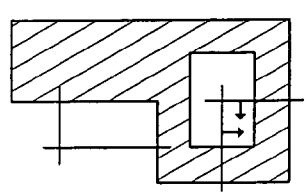
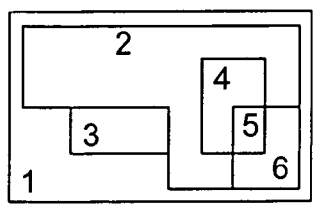
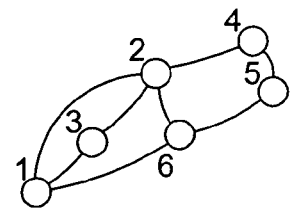
FIG. 27  FIG. 28  FIG. 29
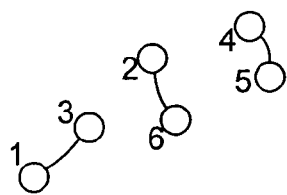
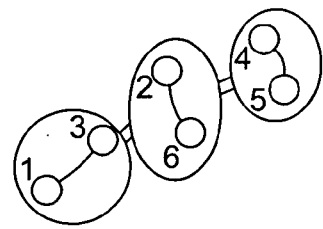
FIG. 30  FIG. 31
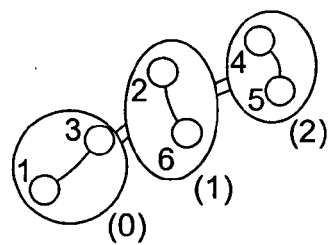
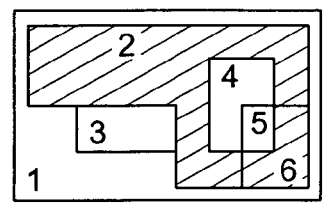
FIG. 32  FIG. 33

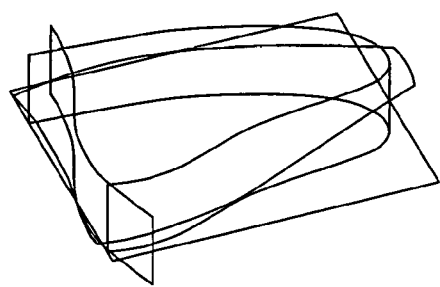
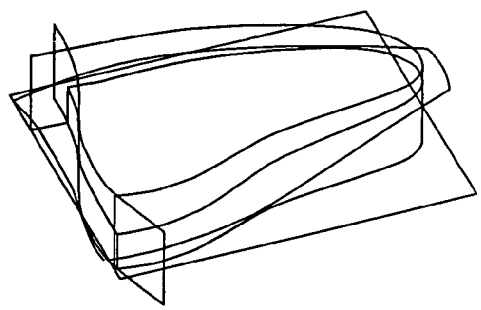
FIG. 34  FIG. 35
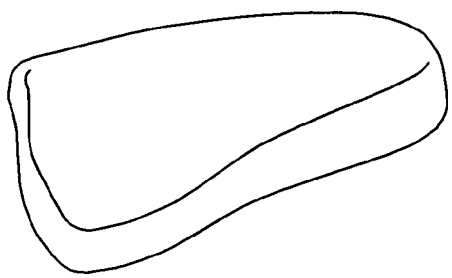
FIG. 36
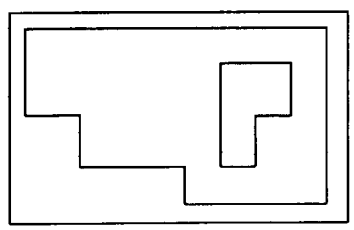
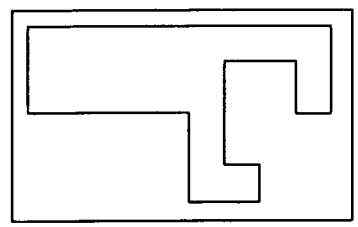
FIG. 37  FIG. 38

OPERATOR FOR SCULPTING SOLIDS WITH SHEET BODIES

CROSS-REFERENCE TO RELATED APPLICATIONS

This application claims the benefit under 35 U.S.C. §119(e) of commonly assigned U.S. Provisional Patent Application Ser. No. 60/412,935, filed on Sep. 23, 2002, by Kenneth J. Hill, entitled "OPERATOR FOR SCULPTING SOLIDS WITH SHEET BODIES," which application is incorporated by reference herein.

BACKGROUND OF THE INVENTION

1. Field of the Invention

The present invention relates generally to computer-assisted design (CAD) systems, and in particular, to a graph-based method for sculpting solids using sheet bodies in a computer-implemented solid modeling system.

2. Description of the Related Art

Over the last decade, designers have changed their fundamental approach to graphics design, moving from two-dimensional (2D) drawing systems to three-dimensional (3D) solid modeling systems. New software makes solid modeling technology available and affordable to virtually anyone.

Solid modeling is a technique that allows designers to create dimensionally accurate 3D solid models in a 3D space represented within a computer, rather than traditional 2D drawings. 3D solid models include significantly more engineering data than 2D drawings, including the volume, bounding surfaces, and edges of a design.

With the graphics capabilities of today's computers, these 3D solid models may be viewed and manipulated on a monitor. In addition to providing better visualization, 3D solid models may be used to automatically produce 2D drawing views, and can be shared with manufacturing applications and the like.

Some 3D solid modeling systems generate parametric feature-based models. A parametric feature-based model is comprised of intelligent features, such as holes, fillets, chamfers, etc. The geometry of the parametric feature-based model is defined by underlying mathematical relationships (i.e., parameters) rather than by simple unrelated dimensions, which makes them easier to modify. These systems preserve design intent and manage it after every change to the model.

An operation often performed by solid modeling systems is the modification of solid bodies using sheet data, such as that recited in of co-pending and commonly-assigned U.S. Utility application Ser. No. 09/887,651, filed on Jun. 21, 2001, by Kenneth J. Hill, entitled "GRAPH-BASED METHOD FOR MULTI-BODIED SWEEP TERMINATIONS," now U.S. Pat. No. 6,906,711 issued Jun. 14, 2005, which application claims the benefit under 35 U.S.C. §119(e) of co-pending and commonly-assigned U.S. Provisional Patent Application Ser. No. 60/269,831, filed on Feb. 20, 2001, by Kenneth J. Hill, entitled "GRAPH-BASED METHOD FOR MULTI-BODIED SWEEP TERMINATIONS," both of which applications are incorporated by reference herein.

However, there is a need for one or more operations to sculpt solids in solid modeling systems. Moreover, the sculpting of solids is a non-trivial operation. This is especially true when multiple bodies are involved in the sculpting operation.

SUMMARY OF THE INVENTION

To address the requirements described above, the present invention discloses a computer-implemented solid modeling system that sculpts solids with sheet bodies by performing a selective Boolean operation on a part body and one or more sheet bodies, wherein faces of the sheet bodies separate the part body into regions of space such that the regions are separated from each other by the faces of the sheet bodies. Cells from the selective Boolean operation are chosen for inclusion or exclusion from the output solid according to a "join" or "cut" option.

BRIEF DESCRIPTION OF THE DRAWINGS

Referring now to the drawings in which like reference numbers represent corresponding parts throughout:

FIG. 18 shows the cellular topology of a solid and an intersecting set of four sheets;

FIG. 19 shows how two solid cells are created, one inside the other;

FIG. 20 illustrates a cellular topology graph for FIG. 18;

FIG. 21 shows how three sheets (surfaces) bound a region of space with a solid;

FIG. 22 shows how, after a sculpt operation completes, the region of space bound by the three sheets and the solid become part of the solid;

FIG. 23 illustrates a bell shaped curve that partially penetrates a solid, wherein material on the indicated side is to be removed;

FIG. 24 illustrates the resulting solid after completion of the sculpting operation;

FIG. 27 shows an initial input part body;

FIG. 28 illustrates the results after preprocessing;

FIG. 29 shows a cellular topology graph (G) for the cells in FIG. 28;

FIG. 30 illustrates how G/P is formed by removal of edges in G that correspond to faces of the part body;

FIG. 31 shows how the meta-graph is formed from the components in G/P;

FIG. 32, which continues from FIG. 31, illustrates how a cell 1 (see FIG. 28) contains the faces comprising the edge of the universe, so distances (in parentheses) are assigned relative to component 1;

FIG. 33 illustrates how cells 2 and 6 are in the odd distance component, and thus are identified as being interior to the part body;

FIGS. 34–36 illustrate four stylized sheet bodies that bound the face of a solid that is the basis for a mouse design;

FIG. 37 shows a resulting solid for a join operation; and

FIG. 38 shows a resulting solid for a cut operation.

DETAILED DESCRIPTION OF THE PREFERRED EMBODIMENTS

In the following description, reference is made to the accompanying drawings which form a part hereof, and which is shown, by way of illustration, an embodiment of the present invention. It is understood that other embodiments may be utilized and structural changes may be made without departing from the scope of the present invention.

Overview

The present invention is a parametric, feature-based solid modeling system that provides an operator for sculpting solids using sheet bodies.

Hardware and Software Environment

Figure 1:
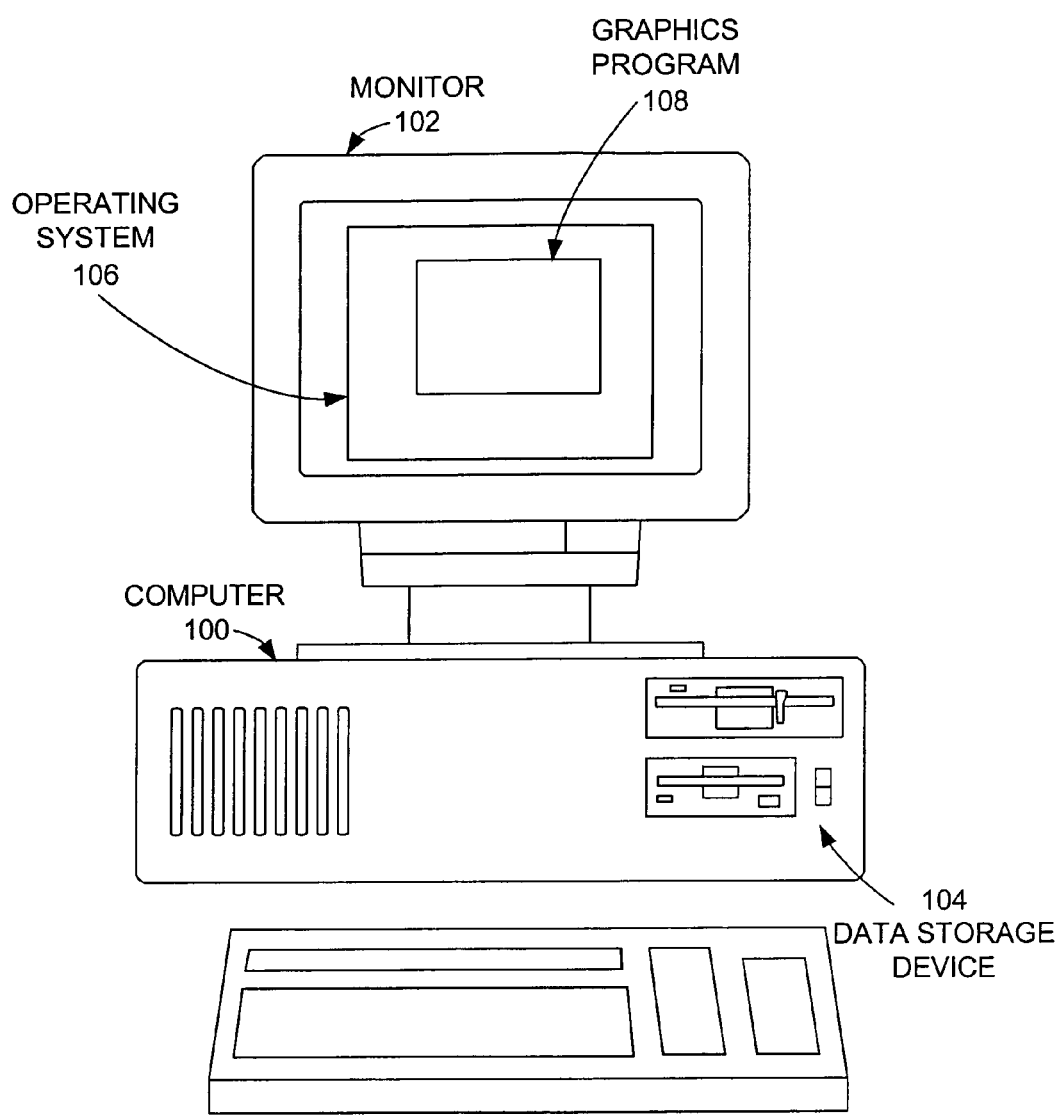
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108, which is also represented by a window displayed on the monitor 102, that operates under the control of the operating system 106. The graphics program 108 preferably comprises a parametric feature-based solid modeling system, although other graphics programs 108 could be used as well.

Generally, the operating system 106 and graphics program 108 comprise logic and/or data embodied in or readable from a device, media, or carrier, e.g., one or more fixed and/or removable data storage devices 104 connected directly or indirectly to the computer 100, one or more remote devices coupled to the computer 100 via data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
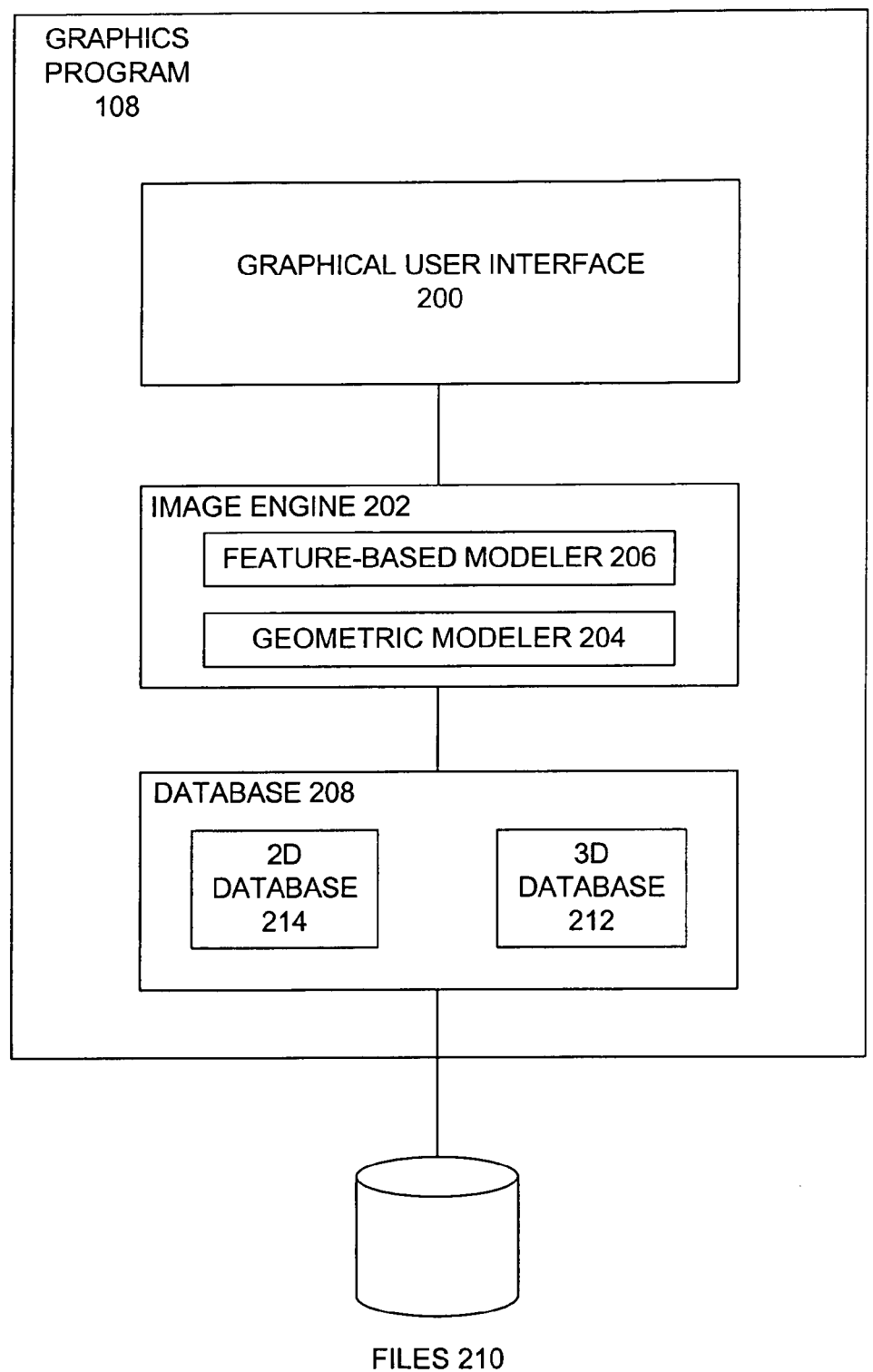
FIG. 2 is a block diagram that illustrates the components of the graphics program 108 according to the preferred embodiment of the present invention.

FIG. 2 is a block diagram that illustrates the components of the graphics program 108 according to the preferred embodiment of the present invention. There are three main components to the graphics program 108, including: a Graphical User Interface (GUI) 200, an Image Engine (IME) 202 including a Geometric Modeler (GM) 204 and Feature-Based Modeler (FM) 206, and a Database (DB) 208 for storing objects in files 210.

The Graphical User Interface 200 displays information to the user and provides the functionality for the user's interaction with the graphics program 108.

The Image Engine 202 processes the Database 208 or files 210 and delivers the resulting graphics to an output device. In the preferred embodiment, the Image Engine 202 provides a complete application programming interface (API) that allows other computer programs to interface to the graphics program 108 as needed.

The Geometric Modeler 204 primarily creates geometry and topology for models. The Feature-Based Modeler 206, which interacts with the Geometric Modeler 204, is a parametric feature-based solid modeler that integrates 2D and 3D mechanical design tools, including parametric assembly modeling, surface modeling, 2D design, and associative drafting. The Feature-Based Modeler 206 provides powerful solid-, surface-, and assembly-modeling functionality.

The Database 208 is comprised of two separate types of databases: (1) a 3D database 212 known as the "world space" that stores 3D information; and (2) one or more 2D databases 214 known as the "virtual spaces" or "view ports" that stores 2D information derived from the 3D information. The 3D database 212 captures the design intent and behavior of a component in a model.

Object Structure

Figure 3:
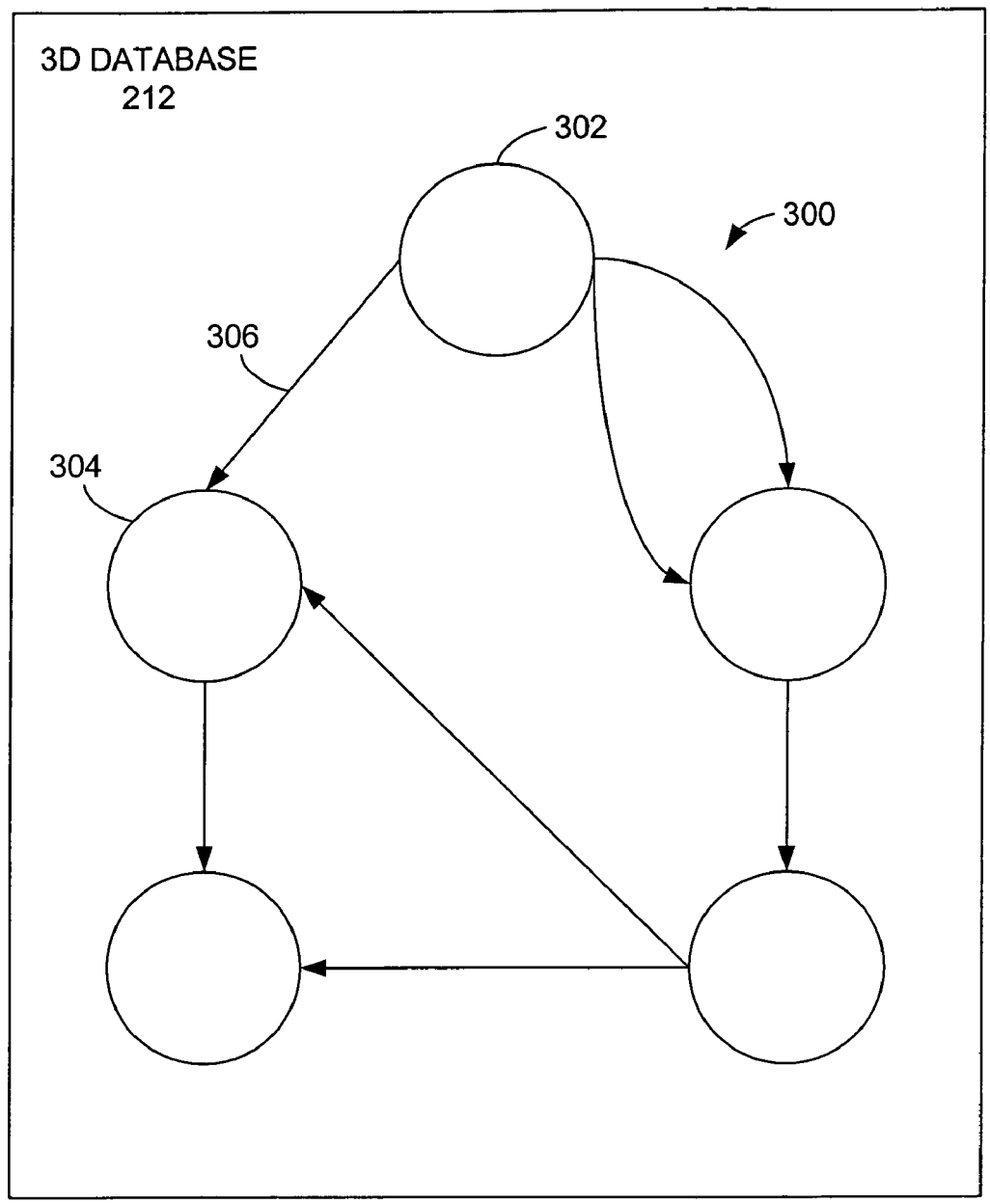
FIG. 3 is a block diagram that illustrates an object structure maintained by a three dimensional database structure according to the preferred embodiment of the present invention.

FIG. 3 is a block diagram that illustrates an object structure 300 maintained by the 3D database 212 according to the preferred embodiment of the present invention. Each object structure 300 includes a header node 302 and usually includes one or more nodes 304 connected by zero or more edges 306. There may be any number of different object structures 300 maintained by the 3D database 212. Moreover, a node 304 may be a member of multiple structures 300 in the 3D database 212.

Operation of the Preferred Embodiment

Boundary Representations (B-Reps)

A solid is represented in the Feature-Based Modeler 206 by means of a boundary representation (b-rep) model. The boundary representation comprises a hierarchy of topological objects that define the boundaries of successively simpler elements of the model.

Each solid is comprised of disconnected parts called "lumps." Most solids have only one lump, although most boundary representation models allow solids to have multiple lumps.

Figure 4:
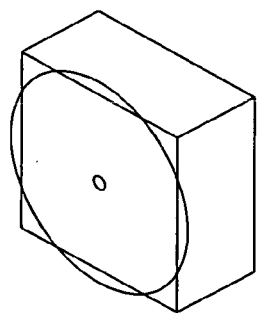
FIG. 4 illustrates how multi-lump bodies can be created.
Figure 5:
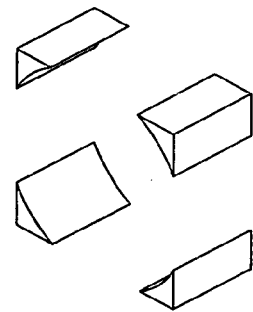
FIG. 5 illustrates a multi-lump body.

FIGS. 4 and 5 illustrate how multi-lump bodies can be created. For example, in FIG. 4, a circular profile could be extruded through a body with a "cut" operation. The result is the multi-lump body of FIG. 5.

Each lump contains one or more "shells." These shells are comprised of a collection of faces that separates the inside portion of the lump from the outside. A lump can have several shells. There is typically an exterior shell which bounds the infinite void from the material, but there may also be interior shells which separate the material from pockets of empty space.

Each shell contains a set of one or more "faces." These faces are the infinitely thin boundaries between what is inside the solid and what is outside. A spherical lump might have only one face (on the one shell), or its surface might be chopped up into a patchwork of faces. A cube typically has six faces, but could have more if some of the sides are split. Each face is required to be smooth in the sense that there are no sharp ridges in the interior of the face. Underlying each face is a surface that represents the geometry associated with the face. The surface gives the face structure.

In some b-rep models, there is a topological entity called a "half-face" that determines what side of the face is considered outside of the lump. Other b-rep models describe half-faces as special faces. When half-faces are present, the shells are comprised of half-faces, and the half-faces are associated to a face.

Each face is bounded by zero or more loops. A loop is to a face what a shell is to a lump. A spherical face might have no loops. The side of a block typically has one loop. A side of a cube with a round hole in it has two loops: one for the square outer boundary of the face, one for the round hole.

Each loop is comprised of multiple "half-edges" (often called "co-edges" or "fins"). These half-edges represent the usage of an edge (the next lower topological item) by a face. The half-edge answers the question "does the loop traverse an edge in the same parametric direction of the edge, or in the reverse direction?"

Associated with each half-edge is an "edge." An edge can be thought of as being an infinitely thin wire. Each edge has a direction of traversal based on the underlying mathematical equation of the curve associated with the edge.

Edges are bounded by zero, one, or two "vertices." Vertices connect a physical point as a termination to an edge.

Figure 6:
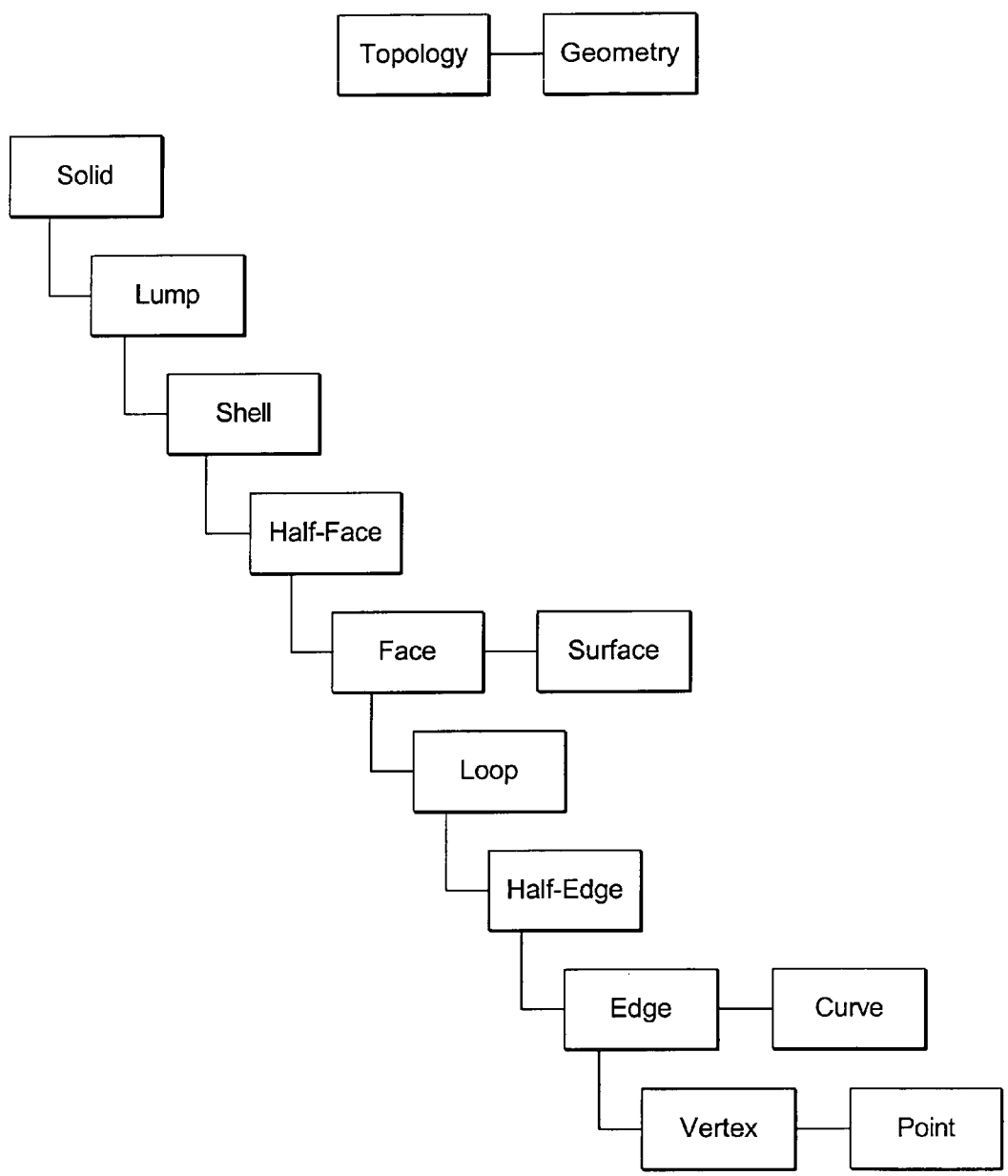
FIG. 6 is a topology chart of a hierarchy of topological entities used to represent a solid and their associated geometry entities.

The topology chart of FIG. 6 shows the hierarchy of topological entities used to represent a solid and their associated geometry entities: solid, lump, shell, half-face, face/surface, loop, half-edge, edge/curve, and vertex/point.

Attributes

The Feature-Based Modeler 206 has the ability to attach data to topological entities. Each such datum is usually called an "attribute." Attributes typically have programmable behaviors so that they can respond appropriately to common operations such as splitting, merging, copying, or transforming the entity to which they are attached.

For example, to track how a certain face is split during a Boolean operation, an attribute can be placed on that face with the following behaviors:

Split behavior: Each resultant face gets a copy of the attribute.

Merge behavior: If either of the two faces being merged has the attribute, then the resultant face has a copy of the attribute.

Copy behavior: This behavior is not usually encountered in a Boolean operation.

Transform behavior: This behavior is not usually encountered in a Boolean operation.

After the Boolean operation is completed, all faces are examined to see which ones contain the attribute.

Suppose that the system needs to track two faces, one of type A and one of type B. An attribute could be created for each type to track, but a more compact way of doing it is to create an attribute (perhaps called AttribFaceTrack) with two Boolean data members (data items containing true or false values). These data members can be distinct bits of a single machine word, for example, wherein the first bit indicates whether the face is of type A, and the second bit indicates whether the face is of type B. The merge behavior could then be changed so that if each of the merging faces has an attribute of type AttribFaceTrack but with different faces indicated, the attribute on the resultant face has both faces indicated. After the Boolean operation, some faces will have no attribute of type AttribFaceTrack, some will have type A indicated, some will have type B indicated, and others will possibly have type A and B indicated.

This multi-face tracking behavior will be used in a slightly more complex form to perform the sculpting operator of the present invention.

Cellular Topology

When speaking of the physical world, one expects that two bodies will not occupy the same space at the same time. In the symbolic world, there is no such restriction. When solids intersect, space is divided into the following types of disjoint regions: regions that are outside of both bodies (called "the void"); regions that are inside the first body, but outside the second; regions that are inside the second body, but outside the first; and regions that are inside both bodies. The disjoint regions, interior to at least one of the solids, are called "cells." There may be more than one cell of the same type.

Figure 7:
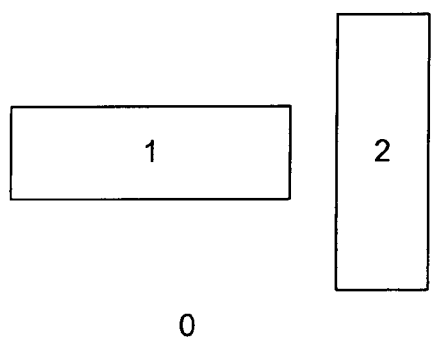
FIG. 7 illustrates how, in two dimensions, two disjoint regions form three types of regions (marked 0, 1, 2)
Figure 8:
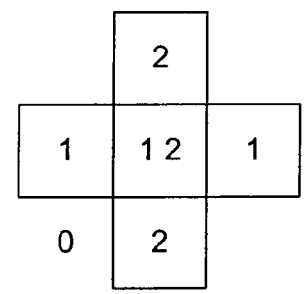
FIG. 8 illustrates how four types of regions are formed when the regions intersect.

FIG. 7 illustrates this concept. In two dimensions, two disjoint regions form three types of regions (marked 0, 1, 2). FIG. 8 illustrates how four types of regions are formed when the regions intersect. Moreover, five cells are formed in FIG. 8.

Two cells are called "adjacent" if they share at least one common face. In the two dimensional analogs that will be frequently used herein for illustration purposes (e.g. FIG. 8), cells will be adjacent when separated by a common edge.

Figure 9:
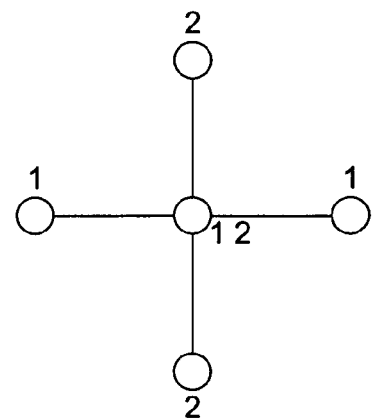
FIG. 9 is a cellular topology graph for FIG. 8.

From the cells of intersecting bodies and the notion of adjacency, one may use graph theory to generate a useful abstraction of the connectivity of the cells. Let each cell (other than the void cells) be represented as a vertex on the graph (not to be confused with the b-rep vertices) and let two vertices be connected by an edge (again, not a b-rep edge) if and only if the cells associated with those vertices are adjacent. The resulting graph is called a "cellular topology graph" or simply a "ct-graph." For example, FIG. 9 is a ct-graph for FIG. 8.

One can augment the ct-graphs by labeling the vertices by their kind: 1 if the associated cell is in the first body, 2 if in the second body, and 1,2 if the associated cell is in both bodies.

Selective Boolean Operations on Two Solid Bodies

A "Boolean operation" between two bodies creates a new solid from portions of each body, wherein the body being modified is called the "blank body," and the body doing the modification is called the "tool body." After a "join" Boolean operation, the blank body is modified to contain all the material from both the original blank body and the tool body. After a "subtract" Boolean operation, the entire material interior to the tool body is removed from the blank body. An "intersect" Boolean operation replaces the blank body with only that material which is in both the tool body and the original blank body.

Each of the Boolean operations types presented above can be represented in terms of cellular topology. The system creates the ct-graph for the intersecting bodies, and then decides which vertices of the ct-graph to keep. If a particular vertex present in the resulting ct-graph is kept, then its associated cell is present in the resulting solid. In this application, the convention is that the tool body is associated with the "1" vertices and the blank body is associated with the "2" vertices.

Figure 10:
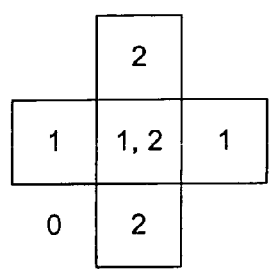
FIG. 10 illustrates two-dimensional intersecting bodies.
Figure 11:
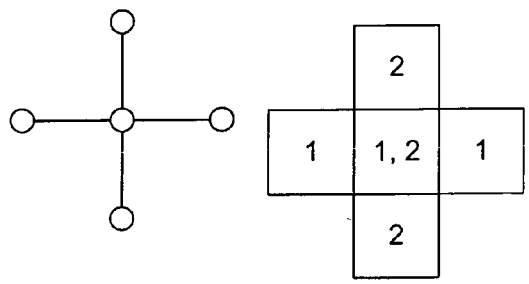
FIG. 11 illustrates how a join operation keeps all cells in a cellular topology graph.
Figure 12:
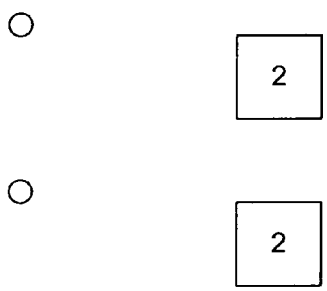
FIG. 12 illustrates how a subtract operation keeps only the 2 vertices.
Figure 13:
FIG. 13 illustrates how an intersect operation keeps only the 1, 2 vertex.

FIGS. 10, 11, 12 and 13 illustrate these operations. FIG. 10 illustrates the 2D intersecting bodies, FIG. 11 illustrates how a join operation keeps all cells in the ct-graph, FIG. 12 illustrates how a subtract operation keeps only the "2" vertices, and FIG. 13 illustrates how an intersect operation keeps only the "1,2" vertex.

Figure 14:
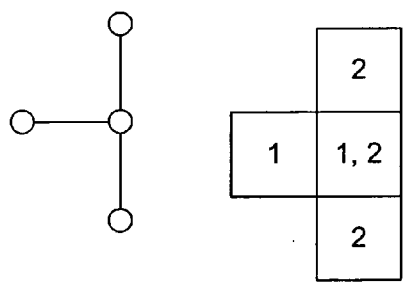
FIG. 14 illustrates a selective Boolean removing only one cell.

There may be times when operations other than the three above are needed. When this is occurs, an algorithm may choose to do a "selective Boolean" in which the algorithm explicitly selects which vertices (and therefore which cells) are kept. For example, perhaps it is desired to keep all the cells except the right "1" vertex. Removing one vertex from the ct-graph can do this, as shown in FIG. 14, which illustrates a selective Boolean removing only one cell.

Selective Boolean Operations on Two Sheet Bodies

A selective Boolean on two sheet bodies produces a ct-graph, wherein the vertices represent cells and the edges represent the connectivity between the cells. The cells are not bounded regions of space as in the solid selective Boolean, but rather bounded subsets of the original sheets.

As in the description of selective Boolean operations on two solid bodies, selective Booleans on sheets can be described using planar analogs. Curves on the plane represent cells and hence are vertices in the ct-graph, while the junctions between these curves are the connective entities and therefore represent the edges of the ct-graph.

Figure 15:
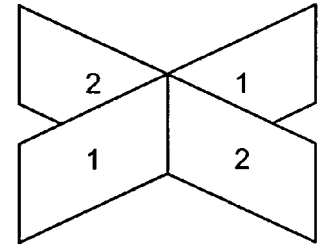
FIG. 15 shows the cellular topology of two intersecting (edge aligned) sheets.
Figure 16:
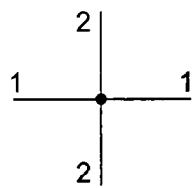
FIG. 16 shows a two-dimensional analog of FIG. 15.
Figure 17:
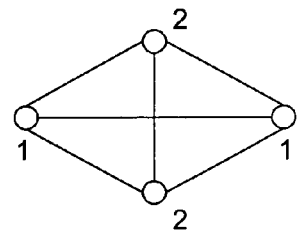
FIG. 17 is a cellular topology graph for the configuration of FIG. 15.

For example, FIG. 15 shows the cellular topology of two intersecting (edge aligned) sheets. FIG. 16 shows a 2D analog of FIG. 15 and FIG. 17 is a ct-graph for the configuration of FIG. 15. Note that each face in FIG. 15 connects to every other face (through the edge of intersection), and thus the ct-graph of FIG. 17 is fully connected.

Selective Boolean Operations on One Solid and One Sheet Body

When a selective Boolean operation is performed on a solid body and a sheet body, the faces of the sheet body may separate the solid into regions of space such that the regions are separated from each other by faces from the sheet body.

This can be discussed using a 2D analog. Solid bodies are represented in 2D as regions and sheet bodies as curves.

FIG. 18 shows the cellular topology of a solid and an intersecting set of four sheets. Each line within the cube represents an individual sheet body. The analogous 3D figure would contain an outer cube, and six intersecting planar faces bounding an inner cube.

FIG. 19 shows how two solid cells are created, one inside the other. Notice that the portions of the sheet body that did not contribute to the separation (the "overhangs") have been removed. The outer cell has a square hole in it, the inner cell is precisely fills the hole. For the analogous 3D figure, there would be a cubical cell with a cubical void in its center, and another smaller cubical cell that precisely fills that void.

FIG. 20 illustrates a ct-graph for FIG. 18.

Input

In the preferred embodiment, the input to the operation includes the following:

1. A solid body on which to operate, called a "part body." If no part body is provided, some operations may still be allowed.

2. An option: join or cut. Join specifies that material will be added to the part body, and cut specifies that material will be taken away from the part body.

3. A set of sheet bodies, known as "limiting sheets." Associated with each sheet body is a face side label that indicates which side of the sheet should be used. Possible values are "normal," "anti-normal," or "both."

4. Other data which can be used to modify the solution. For example, alternate embodiments of this invention could allow users to select faces that indicate where material is to be added or deleted.

Output

A new solid is created that replaces the input solid (if any).

In the case of a join, the output of the operation is to add any regions of space that are bound by the part body and the limiting sheets, and that use the correct side of the sheets according to their face side labels, or that satisfy some other selection criteria.

FIG. 21 shows how three sheets (surfaces) bound a region of space with a solid. In this case, the face side labels can all be set to BOTH, since there is no ambiguity.

FIG. 22 shows how, after the operation completes, the region of space bound by the three sheets and the solid become part of the solid.

For a cut, any regions of the part body that are bound by the faces of the part body and the limiting sheets, and which are on the side of the sheets specified by the face side label, are removed. Since there is ambiguity as to which portion of the part body is to be cut, the face side labels must not be BOTH.

FIG. 23 illustrates a bell shaped curve that partially penetrates a solid, wherein material on the indicated side is to be removed. FIG. 24 illustrates the resulting solid after completion of the sculpting operation.

Logic of the Preferred Embodiment

Figure 25:
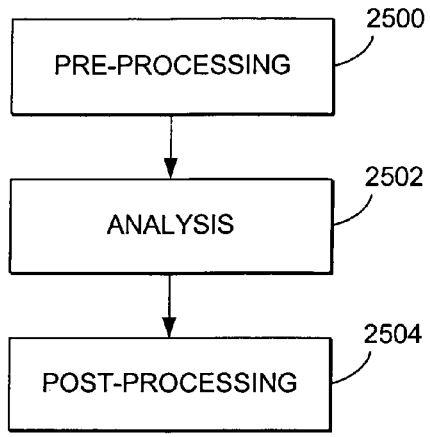
FIG. 25 is a flowchart that illustrates the logic performed according to the preferred embodiment of the present invention.

FIG. 25 is a flowchart that illustrates the logic performed according to the preferred embodiment of the present invention. Specifically, this logic describes a method for sculpting solids with sheet bodies in a computer-implemented solid modeling system, comprising performing a selective Boolean operation on a part body and one or more sheet bodies, wherein faces of the sheet bodies separate the part body into regions of space such that the regions are separated from each other by the faces from the sheet bodies.

Block 2500 represents the step of performing a preprocessing phase to create a cellular topology graph of a tool body and a blank body created from the part body and/or sheet bodies.

Block 2502 represents the step of performing an analysis phase to categorize and convert cells in the cellular topology graph.

Block 2504 represents the step of performing a post-processing phase to integrate results from the analysis phase to create an output part body.

These steps are described in more detail below in conjunction with FIG. 26.

Preprocessing

Figure 26:
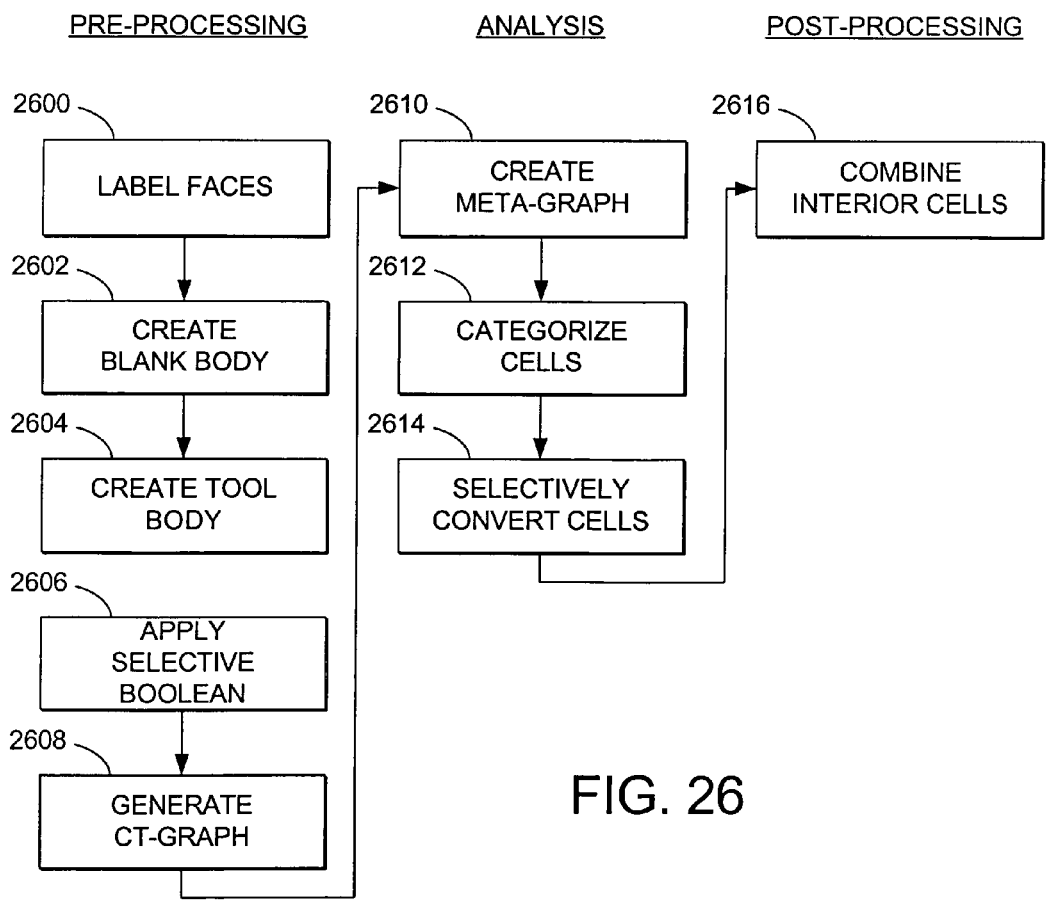
FIG. 26 is a flowchart that illustrates in more detail the logic performed according to the preferred embodiment of the present invention.

FIG. 26 is a flowchart that illustrates in more detail the logic performed according to the preferred embodiment of the present invention.

Block 2600 represents the step of labeling faces in the part body and sheet bodies. All faces in the part body are marked with an attribute that identifies them as being part of the part body, and all faces on the limiting sheets are marked with an attribute that identifies them as being part of the limiting sheets. The behavior of these attributes are set so that as faces are split and merged back together, the algorithm will be able to identify where they originally came from.

Block 2602 represents the step of creating a blank body from the part body and sheet bodies. The first step is turning the input part body (if any) into a 2D manifold, i.e., a hollowed-out part body, leaving only the shell. The faces are still there and they still have their "original part body" attribute, but they now form a sheet body, not a solid body. Each face in this sheet body is considered to be double-sided, whereas before they were single-sided. The blank body is created by uniting all the limiting sheets together with the hollowed-out part body. The result of this union is (in general) a non-manifold sheet body—non-manifold because there will be edges that are adjacent to more than two faces, as when the limiting sheets penetrate the faces from the original part body or other sheets.

Block 2604 represents the step of creating an ambient solid tool body (known as the "universe") that is large enough to contain the blank body in its entirety. The tool body for this operation is a simple solid. An easy way to do this is to create a tool body slightly larger than the bounding box of the blank body. This large tool body is also called "the universe body" and the faces on this tool body, being further out than any other relevant geometry, are called collectively "the edge of the universe." The faces comprising the edge of the universe are labeled with an identifying attribute so they can be recognized at other stages of the algorithm.

Block 2606 represents the step of applying a selective Boolean operation to the tool body and blank body to generate a collection of solid cells, which are sub-solids of the universe body. To be precise, the union of all these cells is identical to the universe body. Furthermore, the intersection of any two cells will contain no volume; that is, they are disjoint except perhaps that they may share faces at their boundary.

Block 2608 represents the step of generating a ct-graph that contains a vertex for each cell in the collection of solid cells, and graph edges between pairs of vertices whenever their associated cells in the collection of solid cells are adjacent.

Analysis

Block 2610 represents the step of creating the meta-graph from the ct-graph and the part body.

Some of the cells in the collection of solid cells contain volume that was interior to the original part body, and the remaining cells in the collection of solid cells contain volume that was not, i.e., that was exterior to the original part body. The meta-graph provides a tool to identify the type (interior or exterior) of each cell in the collection.

A new graph is created, wherein the new graph is called G/P. G refers the ct-graph created in the preprocessing step above, and P refers the original part body. The new graph contains all the vertices of G. The edges of G represent adjacency of cells. Adjacent cells are separated by faces. All edges of G are put in G/P, except those that represent adjacency through faces from the original part body. These faces are readily identifiable because they are labeled with identifying attributes that tracked the faces as they were split during creation of the blank body.

Because the faces of the part body must separate space (one cannot pass from the inside of the part body to the outside without passing though a face of the part body), the graph G/P contains at least two components. (In graph theory, a component is a maximal connected subset of a graph.) By construction, G is a single component, but G/P is G split apart.

Using this technique, each component of G/P is a set of vertices whose associated cells are either all interior or all exterior to the original part body.

The meta-graph is constructed from G/P as follows: A vertex is created in the meta-graph for every component of G/P. An edge is created in the meta-graph between two vertices whenever the associated components are adjacent in G. In other words, if there is at least one cell from each component that were adjacent in G via one of the edges removed in the creation of G/P.

FIG. 27 shows an initial input. The shaded region bounded by heavy black lines represents the initial part body with an internal void. The intersecting lines represent the limiting sheets. Two of the sheets have arrows extending therefrom indicating the direction in which material is to be added to the part body.

FIG. 28 illustrates the results after preprocessing. Each numbered region represents a cell, and each cell is identified with the number.

FIG. 29 shows a ct-graph (G) for the cells in FIG. 28. The numbers on the vertices correspond to the cell numbers.

FIG. 30 illustrates how G/P is formed by removal of edges in G that correspond to faces of the part body.

FIG. 31 shows how the meta-graph is formed from the components in G/P. Cell 2 is adjacent to cell 3 in G, and thus component 2 is adjacent to component 3 in the metagraph. Similarly component 2 is adjacent to component 4. (Components are named after any of the vertices contained in them.)

Block 2612 represents the step of categorizing the meta-graph's cells as either I-cells ("inside" or interior cells) or O-cells ("outside" or exterior cells).

By construction, there is exactly one vertex in the meta-graph that contains a cell with faces from the edge of the universe. To be more precise, at the cost of being less clear, there is exactly one vertex of the meta-graph that is associated to a component of G/P that contains a cell with faces from the edge of the universe. The distinction being that the meta-graph does not actually contain cells (it contains vertices), but the distinction can be blurred since every cell is associated with exactly one vertex in the meta-graph.

This unique vertex with faces from the edge of the universe is called the "universe vertex." An integer is assigned to each vertex of the meta-graph according to the minimum number of edges that must be traversed to get to this vertex from the universe vertex. This integer is called the "distance" between the vertex in question and the universe vertex. The universe vertex itself is distance 0 from itself, components adjacent to the universe vertex have are distance 1, etc.

The distance operator indicates how whether the cells are "inside" or "interior to" the original part body or whether the cells are "outside" or "exterior to" the original part body. If a cell is in a vertex of the meta-graph that is an even numbered distance from the universe vertex, then it is exterior to the part body. If a cell is in a vertex of the meta-graph that is an odd numbered distance from the universe vertex, then it is interior to the part body.

FIG. 32, which continues from FIG. 31, illustrates how a cell 1 (see FIG. 28) contains the faces comprising the edge of the universe, so distances (in parentheses) are assigned relative to component 1.

FIG. 33 illustrates how cells 2 and 6 are in the odd numbered distance component, and thus are identified as being interior to the part body.

Block 2614 represents the step of selectively converting the categorized cells from interior to exterior or exterior to interior based on the choice of option, cut or join, respectively.

At this point, much of the operation has been performed. The set of cells created by applying a selective Boolean operation on the tool body and blank body breaks up space into a collection of solid cells. These cells are sorted into groups that are either inside the part body or outside the part body. If post processing was performed immediately, the resulting solid would be exactly the input solid. Hence, this step is the one that actually effects a change to the part body.

A cell is called "critical" if the faces bounding the cell are all either faces of the part body or faces of the limiting sheets used on the side determined by the face side label. The universe cell is never critical.

Alternative embodiments of the present invention could use other criteria for critical cells. For example, cells may be considered critical if they if they satisfy the previous requirements, and additionally they contain one of a specific set of faces selected by the user. Such an alternative embodiment would allow the user to better restrict where new material is added or deleted.

If a join is being performed, then all critical exterior cells are converted to interior cells. On the other hand, if a cut is being performed, then all critical interior cells are converted to exterior cells.

Note that for the join, no part body is necessary, but for the cut, a part body is required. If there is no part body in the cut, there are no interior cells for cut to operate on. For the join, however, in the absence of a part body, any set of limiting sheets that bound a region of space may be used to form new solid cells, thereby creating a part body where one did not exist before.

Consider, for example, FIGS. 34–36. FIG. 34 illustrates four stylized sheet bodies that bound the face of a solid that is the basis for a mouse design. FIG. 35 shows how, after a fill command is performed, an interior formed by the sheet bodies becomes solid. FIG. 36 shows that the solid can then be used for further operations.

Post-Processing

Block 2616 represents the step of combining the cells marked as interior to create an output part body.

FIG. 37 shows a resulting solid for a join.

FIG. 38 shows a resulting solid for a cut. In this case, some limiting sheets do not appear in the final result, which might be flagged as an error.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or system for sculpting solids in a solid modeling system could benefit from the present invention. A computer program other than a solid modeling system, including perhaps a 2D drawing program (wherein the bodies are, in fact, similar to the example figures contained herein) could benefit from this invention.

In summary, the present invention discloses a parametric, feature-based solid modeling system that provides an operator for sculpting solids with sheet bodies by performing a selective Boolean operation on a part body and one or more sheet bodies, wherein faces of the sheet bodies separate the part body into regions of space such that the regions are separated from each other by the faces of the sheet bodies. A "join" option specifies that material will be added to the part body, or a "cut" option specifies that material will be taken away from the part body.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for sculpting a part body with sheet bodies in a computer-implemented solid modeling system, comprising:
    (a) performing a selective Boolean operation on a part body and one or more sheet bodies, wherein faces of the sheet bodies separate the part body into regions of space such that the regions are separated from each other by the faces of the sheet bodies, wherein the performing step (a) comprises performing a pre-processing phase to create a cellular topology graph of tool and blank bodies created from the part body and the sheet bodies, performing an analysis phase to categorize and convert cells in the cellular topology graph; and performing a post-processing phase to integrate results from the analysis phase to create an output part body.

2. The method of claim 1, wherein the step of performing is invoked by a join option.

3. The method of claim 2, wherein the join specifies that material will be added to the part body.

4. The method of claim 1, wherein the step of performing is invoked by a cut option.

5. The method of claim 4, wherein the cut specifies material will be taken away from the part body.

6. The method of claim 1, wherein the sheet body has a face side label that indicates which face of the sheet should be used in the selective Boolean operation.

7. The method of claim 6, wherein the face side label is selected from a group comprising normal, anti-normal or both.

8. The method of claim 1, wherein the performing step (a) further comprises:
    (1) labeling faces in the part body and sheet bodies;
    (2) creating a blank body from the part body and the sheet bodies;
    (3) creating a tool body large enough to contain the blank body in its entirety;
    (4) applying a selective Boolean operation to the tool body and blank body to generate a collection of solid cells;
    (5) generating a cellular topology graph that contains a vertex for each cell in the collection of solid cells, and graph edges between pairs of vertices whenever their associated cells in the collection of solid cells are adjacent;
    (6) creating a meta-graph from the cellular topology graph and the part body;
    (7) categorizing the meta-graph's cells as either interior cells or exterior cells;
    (8) selectively converting the categorized cells from interior to exterior or exterior to interior; and
    (9) combining the meta-graph's cells marked as interior to create an output part body.

9. The method of claim 8, wherein the labeling step (1) comprises marking all faces in the part body with an attribute that identifies them as being part of the part body and marking all faces on the sheet bodies with an attribute that identifies them as being part of the sheet bodies.

10. The method of claim 8, wherein the creating step (2) comprises:
    turning the part body into a hollowed-out part body in order to form a sheet body; and creating the blank body by uniting all the sheet bodies together with the hollowed-out part body to create a non-manifold sheet body.

11. The method of claim 8, wherein the selectively converting step (8) comprises:
converting all critical exterior cells to interior cells, if a join is performed.

12. The method of claim 8, wherein the selectively converting step (8) comprises:
converting all critical interior cells to exterior cells, if a cut is performed.

13. The method of claim 1, wherein an output of the Boolean operation adds any regions of space that are bound by the part body and the sheet bodies, and that satisfies some selection criteria.

14. The method of claim 1, wherein an output of the Boolean operation removes any regions of the part body that are bound by the faces of the part body and the sheet bodies, and that satisfies some selection criteria.

15. An apparatus for sculpting a part body with sheet bodies, comprising:
a computer; and
a solid modeling system, executed by the computer, having logic for:
(a) performing a selective Boolean operation on a part body and a sheet body, wherein faces of the sheet body separate the part body into regions of space such that the regions are separated from each other by the faces from the sheet body, wherein the logic for performing (a) comprises logic for performing a pre-processing phase to create a cellular topology graph of tool and blank bodies created from the part body and the sheet bodies, performing an analysis phase to categorize and convert cells in the cellular topology graph, and performing a post-processing phase to integrate results from the analysis phase to create an output part body.

16. The apparatus of claim 15, wherein the logic for performing (a) is invoked by a join option.

17. The apparatus of claim 16, wherein the join specifies that material will be added to the part body.

18. The apparatus of claim 16, wherein the logic for performing (a) is invoked by a cut option.

19. The apparatus of claim 18, wherein the cut specifies material will be taken away from the part body.

20. The apparatus of claim 15, wherein the sheet body has a face side label that indicates which face of the sheet should be used in the selective Boolean operation.

21. The apparatus of claim 20, wherein the face side label is selected from a group comprising normal, anti-normal or both.

22. The apparatus of claim 15, wherein the logic for performing (a) further comprises logic for;
(1) labeling faces in the part body and sheet bodies;
(2) creating a blank body from the part body and the sheet bodies;
(3) creating a tool body large enough to contain the blank body in its entirety;
(4) applying a selective Boolean operation to the tool body and blank body to generate a collection of solid cells;
(5) generating a cellular topology graph that contains a vertex for each cell in the collection of solid cells, and graph edges between pairs of vertices whenever their associated cells in the collection of solid cells are adjacent;
(6) creating a meta-graph from the cellular topology graph and the part body;
(7) categorizing the meta-graph's cells as either interior cells or exterior cells;
(8) selectively converting the categorized cells from interior to exterior or exterior to interior; and
(9) combining the meta-graph's cells marked as interior to create an output part body.

23. The apparatus of claim 22, wherein the logic for labeling (1) comprises logic for marking all faces in the part body with an attribute that identifies them as being part of the part body and marking all faces on the sheet bodies with an attribute that identifies them as being part of the sheet bodies.

24. The apparatus of claim 22, wherein the logic for creating (2) comprises logic for:
turning the part body into a hollowed-out part body in order to form a sheet body; and creating the blank body uniting all the sheet bodies together with the hollowed-out part body to create a non-manifold sheet body.

25. The apparatus of claim 22, wherein the logic for selectively converting (8) comprises logic for:
converting all critical exterior cells to interior cells, if a join is performed.

26. The apparatus of claim 22, wherein the logic for selectively converting (8) comprises logic for:
converting all critical interior cells to exterior cells, if a cut is performed.

27. The apparatus of claim 15, wherein an output of the Boolean operation adds any regions of space that are bound by the part body and the sheet bodies, and that satisfies some selection criteria.

28. The apparatus of claim 15, wherein an output of the Boolean operation removes any regions of the part body that are bound by the faces of the part body and the sheet bodies, and that satisfies some selection criteria.

29. An article of manufacture embodying logic for sculpting a part body with sheet bodies in a computer-implemented solid modeling system, the logic comprising:
(a) performing a selective Boolean operation on a part body and a sheet body, wherein faces of the sheet body separate the part body into regions of space such that the regions are separated from each other by the faces from the sheet body, wherein the performing step (a) comprises performing a pre-processing phase to create a cellular topology graph of tool and blank bodies created from the part body and the sheet bodies, performing an analysis phase to categorize and convert cells in the cellular topology graph, and performing a post-processing phase to integrate results from the analysis phase to create an output part body.

30. The article of claim 29, wherein the step of performing is invoked by a join option.

31. The article of claim 30, wherein the join specifies that material will be added to the part body.

32. The article of claim 29, wherein the step of performing is invoked by a cut option.

33. The article of claim 32, wherein the cut specifies material will be taken away from the part body.

34. The article of claim 29, wherein the sheet body has a face side label that indicates which face of the sheet should be used in the selective Boolean operation.

35. The article of claim 34, wherein the face side label is selected from a group comprising normal, anti-normal or both.

36. The article of claim 29, wherein the performing step (a) further comprises:

(1) labeling faces in the part body and sheet bodies;
(2) creating a blank body from the part body and the sheet bodies;
(3) creating a tool body large enough to contain the blank body in its entirety;
(4) applying a selective Boolean operation to the tool body and blank body to generate a collection of solid cells;
(5) generating a cellular topology graph that contains a vertex for each cell in the collection of solid cells, and graph edges between pairs of vertices whenever their associated cells in the collection of solid cells are adjacent;
(6) creating a meta-graph from the cellular topology graph and the part body;
(7) categorizing the meta-graph's cells as either interior cells or exterior cells;
(8) selectively converting the categorized cells from interior to exterior or exterior to interior; and
(8) combining the meta-graph's cells marked as interior to create an output part body.

37. The article of claim 36, wherein the labeling step (1) comprises marking all faces in the part body with an attribute that identifies them as being part of the part body and marking all faces on the sheet bodies with an attribute that identifies them as being part of the sheet bodies.

38. The article of claim 36, wherein the creating step (2) comprises:
turning the part body into a hollowed-out part body in order to form a sheet body; and creating the blank body by uniting all the sheet bodies together with the hollowed-out part body to create a non-manifold sheet body.

39. The article of claim 36, wherein the selectively converting step (8) comprises:
converting all critical exterior cells to interior cells, if a join is performed.

40. The article of claim 36, wherein the selectively converting step (8) comprises:
converting all critical interior cells to exterior cells, if a cut is performed.

41. The article of claim 29, wherein an output of the Boolean operation adds any regions of space that are bound by the part body and the sheet bodies, and that satisfies some selection criteria.

42. The article of claim 29, wherein an output of the Boolean operation removes any regions of the part body that are bound by the faces of the part body and the sheet bodies, and that satisfies some selection criteria.

* * * * *